United States Patent [19]

Baumert et al.

[11] Patent Number: 5,392,281
[45] Date of Patent: Feb. 21, 1995

[54] CONTROL OF HYBRID PACKET RINGS

[75] Inventors: Robert J. Baumert, Allentown, Pa.; Stephen Barilovits, Charlotte, N.C.

[73] Assignee: AT&T Corp., Murray Hill, N.J.

[21] Appl. No.: 165,450

[22] Filed: Dec. 13, 1993

[51] Int. Cl.[6] .............................. H04J 3/26; H04J 3/06; H04L 12/64
[52] U.S. Cl. ................................ 370/60.1; 370/85.15; 370/94.2; 370/108
[58] Field of Search ...................... 370/60, 60.1, 85.15, 370/94.1, 94.2, 85.12, 100.1, 108; 359/119, 158

[56] References Cited

U.S. PATENT DOCUMENTS 4,858,232  8/1989  Diaz et al. ................... 370/85.15
5,140,587  8/1992  Mueller et al. ............... 370/85.15

OTHER PUBLICATIONS

"FDDI Hybrid Ring Control (HRC)", Draft Proposed American National Standard, May 14, 1991, X3.186-199X, X3T9/89-43, X3T9.5/87-10, Rev. 6-2.

Primary Examiner—Melvin Marcelo

[57] ABSTRACT

A hybrid ring network is disclosed having stations capable of transmitting and receiving packet and isochronous data. The ring stations include a latency adjustment buffer (LAB) which stores arriving packet data in one random access memory (PBUF) and both arriving packet and isochronous data in a separate random access memory (IBUF). For retransmission over the ring, packet data is read out only from the PBUF in accordance with the packet's retransmission priority. A LAB may be employed at a slave station and may be pre-programmed with a sufficient latency to compensate for an anticipated insertion or removal of a lobe, without changing the total latency of the ring. When a LAB is employed at a cycle master station the latency of the LAB is controlled by the total ring delay.

4 Claims, 9 Drawing Sheets

CONTROL OF HYBRID PACKET RINGS

FIELD OF THE INVENTION

This invention relates to ring networks and, more particularly to high capacity ring networks capable of carrying synchronous data.

BACKGROUND OF THE INVENTION

Heretofore the American National Standard Standards Institute (ANSI) has published a draft standard, document X3.186-199x, entitled "FDDI Hybrid Ring Control" for a family of optical fiber ring network protocols using ring topology known as the fiber distributed data interface, FDDI. The draft protocol postulates a hybrid ring in which time division multiplexed, circuit-switched services may be integrated with variable rate packet switched services. The isochronous data required for the circuit-switched services as well as the packet data are proposed to be carried in special, fixed-length, fixed-duration frames called cycles having a repetitive frame length of 125 microseconds ($\mu$s). The cycle is shown in FIG. 1 hereof and briefly described herein.

The FDDI proposal further contemplates that a hybrid multiplexer at a master station, called a cycle master, would include a "latency adjustment" buffer (LAB) to ensure that isochronous data will take an integral multiple of 125 $\mu$s to travel around the ring. However, the efficient management of isochronous data and packet data requires that conflicting criteria be observed since isochronous data occurs at precise time intervals in fixed amounts, while packet data has an arrival process that is not fixed and may be modelled as exponential or gaussian. In a practical system, isochronous data must be transmitted in exactly the same relationship to the beginning of a cycle as that in which it was received, while packet data must be transmitted with minimum delay between the receipt of a packet symbol and its retransmission, even though this may entail the crossing of cycle boundaries, without regard to what is happening with respect to isochronous data. Accordingly, the realization of a practical latency adjustment buffer has proven to be somewhat elusive. Moreover, in a practical network, sections may be added to accommodate network growth and at other times sections may be deleted or bypassed. Accommodating such changes without shutting down the network presents a major challenge.

SUMMARY OF THE INVENTION

The foregoing and other objects are realized in the illustrative embodiment of our invention in which a hybrid ring network is provided having stations capable of transmitting and receiving packet and isochronous data. The ring station includes a latency adjustment buffer (LAB) which is divided into two separate random access memory (RAM) buffers for holding arriving data for retransmission: a packet buffer (PBUF) which holds only the packet data and an isochronous data buffer (IBUF) which holds isochronous data as well as packet data and interpacket idle bytes. The PBUF and the IBUF may advantageously each be implemented in a 2k $\times$ 10 bit static RAM. The classification of the arriving bytes as isochronous or packet data byte is determined by reading the programming template in the cycle header accompanying each arriving cycle. A cycle state status register stores the address and the status of the arriving cycle in the IBUF static RAM. Cycle status identifies which cycle has most recently been received, which cycle is the next most recently received, and which cycle is currently being sourced to the ring. The master clock determines when a new cycle should be sourced to the ring and, at that time, the appropriate cycle is read out of the IBUF by steadily incrementing the IBUF read address. It is a feature of this aspect of our invention that the address at which data is read from the isochronous buffer is determined in accordance with the amount of variable latency to be inserted into the ring.

While packet data is written into both the IBUF and the PBUF, packet data is read out only from the PBUF for retransmission over the ring. Readout is controlled in accordance with the packet's retransmission priority. To maintain synchronization, as packet data is read out of the PBUF, the IBUF pointer is incremented for each byte read out of the PBUF. At the end of a cycle, the IBUF pointer is incremented in step with idle bytes until the cycle start byte is detected, at which time the multiplexing of data from the PBUF and IBUF begins. Accordingly, packet data arriving toward the end of cycle even when there may be a large portion of the cycle in the IBUF, may be retransmitted at the beginning of the same cycle. The amount of data in the IBUF determines the LAB latency. Since the cycle master transmits only complete cycles, the sum of ring latency and LAB latency equals an integral number of cycles.

Further in accordance with our invention, a LAB may be employed at a slave station and may be pre-programmed with a sufficient latency to compensate for an anticipated insertion or removal of an upstream lobe without changing the total latency of the ring. When a LAB is employed at a cycle master station the latency of the LAB is controlled by the total ring delay, both during hybrid mode initialization and during hybrid mode operation. When a LAB is employed at a slave station, however, its latency is controlled by the network to manage latency associated with an upstream lobe. An initial latency is provided that depends upon the upstream configuration, e.g., the number of upstream symbol pairs to be inserted or deleted when the ring transitions from basic mode operation to hybrid operation. In basic mode operation only packet switching service is provided. In hybrid mode operation both isochronous and packet data are carried. When a slave station has its LAB engaged and an upstream station is removed or added to the ring, the slave LAB can be instructed to take up or add slack so that the downstream station does not experience the change occasioned by the insertion or removal of the lobe.

GENERAL DESCRIPTION OF THE FDDI PROTOCOL (PRIOR ART)

Figure 1:
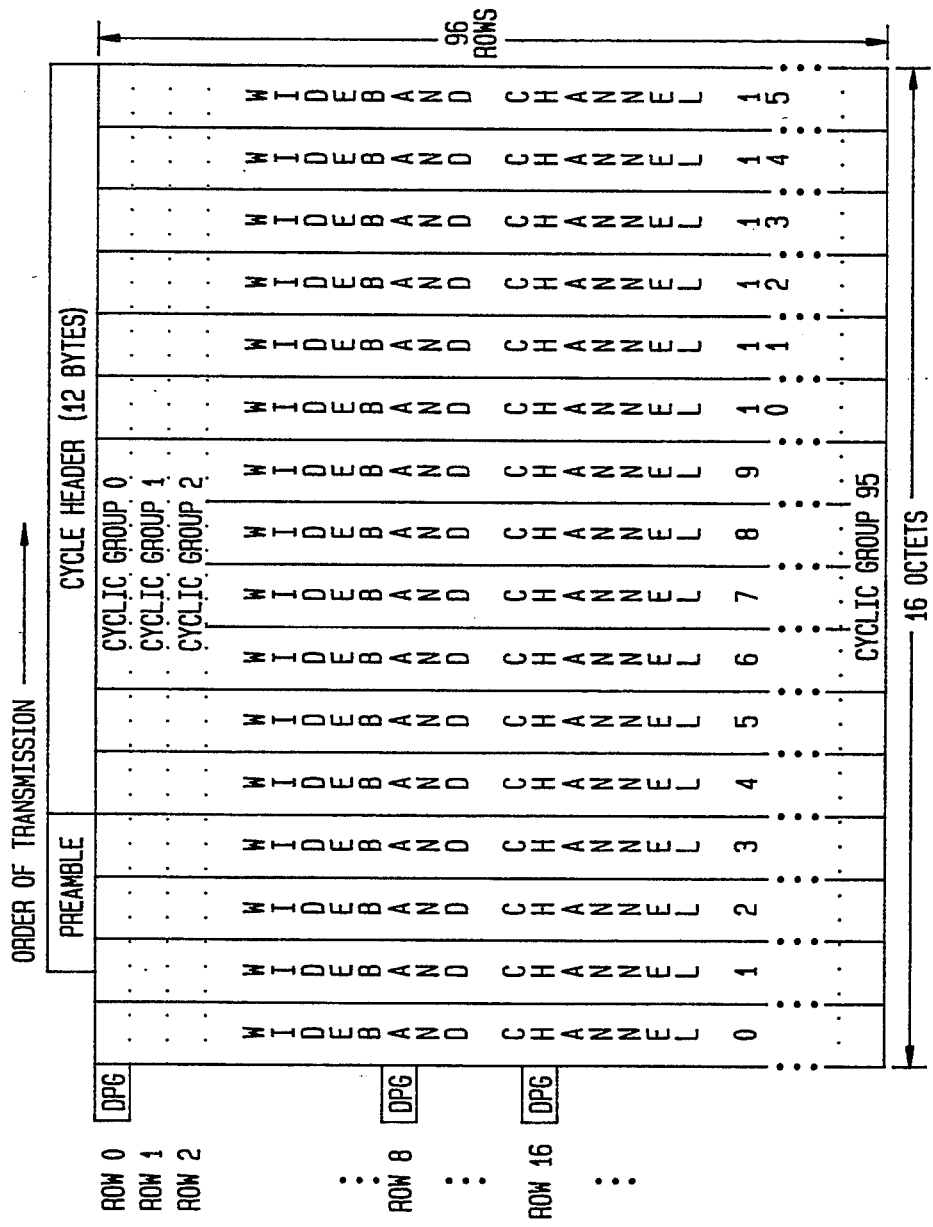
FIG. 1 shows the structure of a cycle that is transported on the ring network, as disclosed in the above-mentioned ANSI proposal.

As shown in FIG. 1, the FDDI protocol envisions that each cycle be partitioned into four parts: the preamble, the cycle header, dedicated packet groups and sixteen wideband channels. The header consists of 12 bytes and the preamble may have two or three bytes, nominally 2.5. The wideband channels comprising the body of a cycle have a total of 1560 bytes. Each wideband channel provides 6.144 Mbps of bandwidth. Each 8-bit byte of a transmission channel provides 64 kbps of isochronous bandwidth. Each wideband channel may be dedicated to either isochronous or packet data, as identified in the programming template of the cycle header. A new cycle is generated every 125 µs by one station that is designated the cycle master. All other stations, called slaves, repeat incoming cycles for retransmission onto the ring after inserting their own packet and isochronous data into the cycles. Cycles circulate around the ring and return to the cycle master. Multiple cycles can be present on the ring at the same time. The round trip travel time around the ring network is called the isochronous channel latency. A cycle master must have a latency adjustment buffer in its data path so that the ring's isochronous latency is an integral number of cycles.

During normal hybrid mode operation, the cycle master station transmits cycles consisting of a preamble, cycle header, dedicated packet group and cyclic data groups every 125 µs. In the absence of errors, "slave stations" monitor and repeat the cycle header unchanged. Within the cycle header, a programming template identifies to the stations the data within each wideband channel as being either packet data or isochronous data. In the absence of errors, only the cycle master may change the programming template.

RECEIVING AND RETRANSMITTING CYCLES (FIGS. 2-12)

Figure 2:
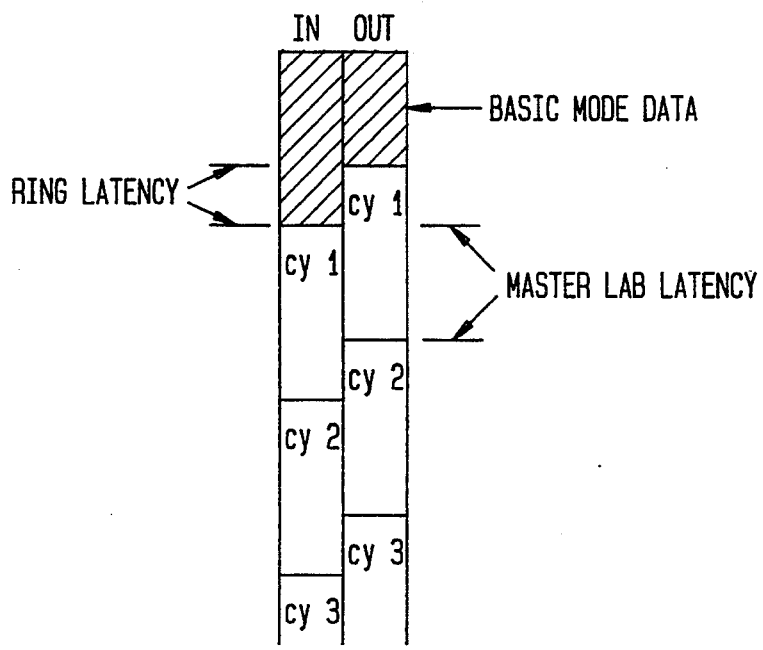
FIGS. 2 through 12 show the relationship between received and transmitted cycles under various conditions of ring latency and local buffer latency.
Figure 3:
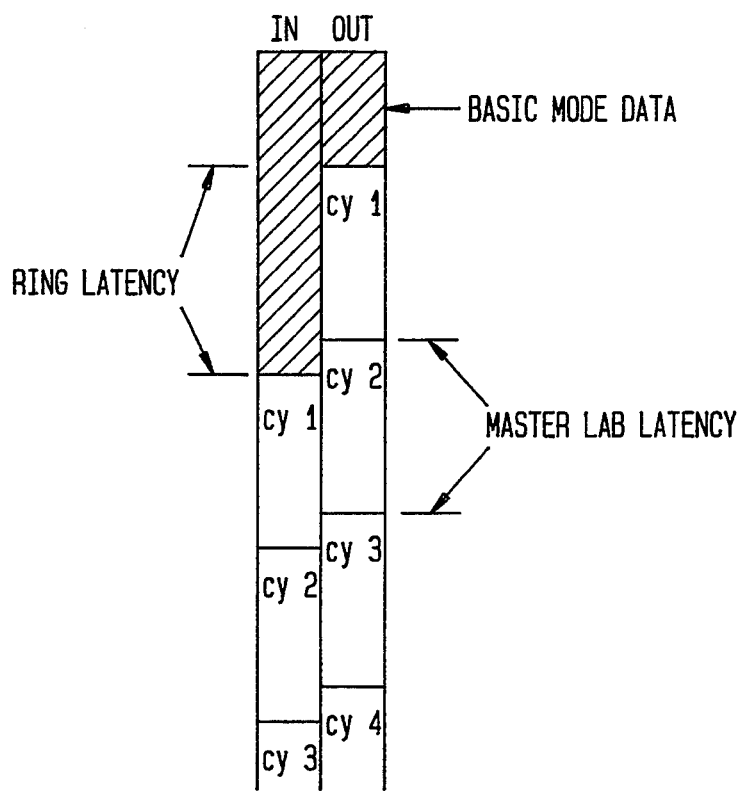

Prior to the time that synchronization is established on the ring, a cycle master transmits cycles on the ring and awaits their return from the ring. FIGS. 2 and 3 illustrate this process for small and large ring latencies. In these figures, time flows from top to bottom, received data is in the left column, and transmitted data is in the right column. Transmission of isochronous data from the ring is delayed by a time equal to the LAB latency. Since the cycle master transmits only complete cycles, the sum of the ring latency and the LAB latency equals an integral number of cycles. In FIG. 2, the total latency is one cycle, and in FIG. 3 it is two cycles.

In both FIGS. 2 and 3, the cycle master begins transmitting cycle 1 while basic mode symbol pairs are being received. In FIG. 2, the header of cycle 1 is received while cycle 1 is still being transmitted. Accordingly, the Cycle master must transmit only fill (idle) symbols in cycle 1 but isochronous data from the received cycle 1 can be repeated when cycle 2 is transmitted.

In FIG. 3, basic mode data is received by the Cycle master not only throughout the transmission of cycle 1 but during part of the transmission of cycle 2 as well. Accordingly, isochronous data consisting of all idle symbols must be transmitted during cycles 1 and 2, and the data from received cycle 1 must await the transmission of cycle 3. The initial latency set up in the IBUF is automatically controlled by ring latency: isochronous data is removed from the IBUF synchronously with the 8 kHz cycle clock, but the timing of the data coming into the IBUF is determined by the ring. In both FIGS. 2 and 3, the latency introduced by the master station's LAB is under one cycle.

Figure 4:
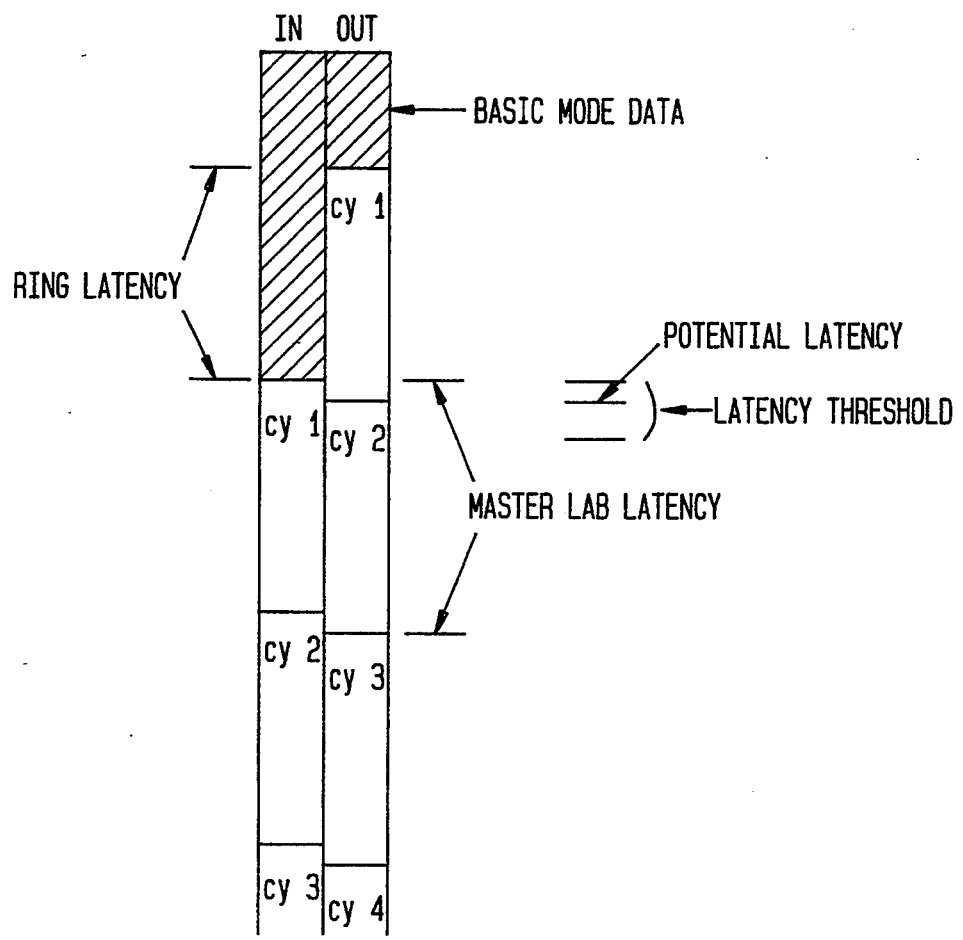

The foregoing control policy is altered if the header of cycle 2 is received just a few symbol pairs before the next cycle is due to be transmitted creating a condition where only a small amount of IBUF latency could be applied, as illustrated in FIG. 4. Here, the ring latency is just under one full cycle so that the master station's LAB could possibly set up a potential latency of only a few bytes. However, if the ring latency should later grow (for example, due to temperature effects on optical cables and local clock sources) so that its latency was just over a full cycle, the master station would be required to generate a cycle whose isochronous data is all fill.

Figure 5:
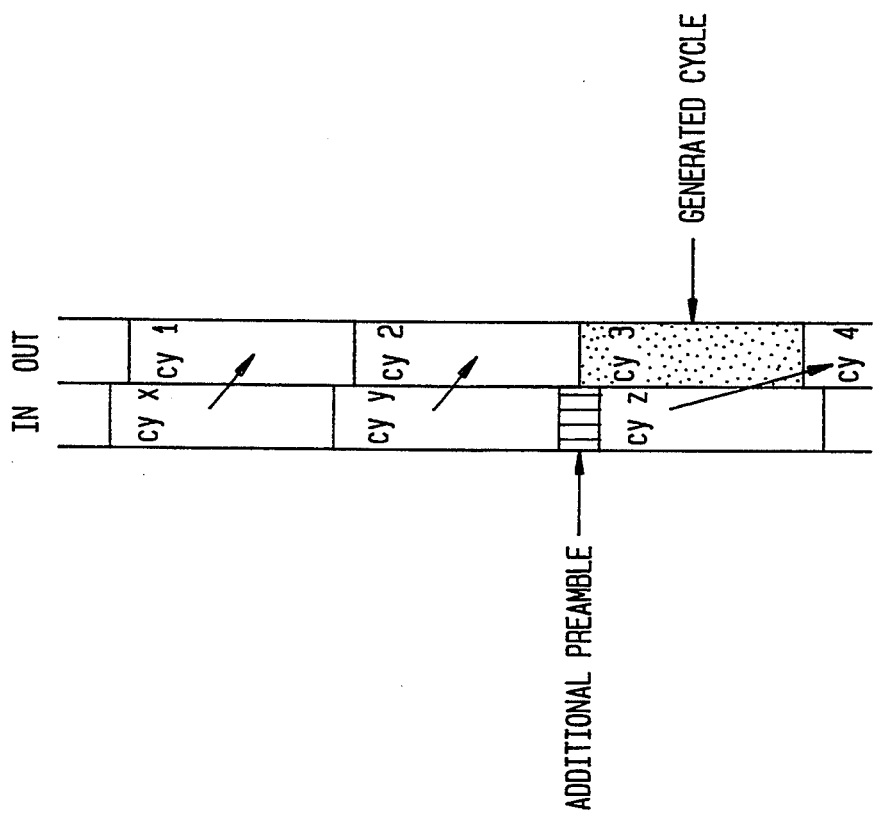

This is illustrated in FIG. 5 where the ring latency grows between incoming cycles 'y' and 'z', so that cycle 'y' data is repeated in transmitted cycle 2. The data that is transmitted in cycle 3 is fill, and cycle 'z' data is repeated in cycle 4. There is thus a cycle's worth of delay inserted between data from cycle 'y' and cycle 'z'. Such slippage can cause synchronous protocols running in the isochronous wideband channels to lose synchronization, and should be avoided, when possible. Accordingly, when the Cycle master is in the RESYNC state and the potential IBUF latency is less than a minimum threshold, the Cycle master will force an additional cycle's worth of delay in the IBUF. The threshold value is obtained from a programmable register. If the ring later becomes slightly larger than a cycle, the IBUF automatically sheds latency to have less than a cycle's worth, and no slippage occurs.

IBUF Initialization—Slave Station

A station operating in basic mode becomes a hybrid mode slave when it receives a cycle with a cycle sequence number or a rank greater than its operative rank. If the station is required to engage its LAB as a slave (state=SLAVE) and pre-programmed latency is not zero), the station must establish its pre-programmed latency in its IBUF from a programmed register. When the station receives a cycle to which it will yield and become a slave, it places all of the incoming data into its IBUF while it transmits idles. When the IBUF latency equals the pre-programmed latency, the station starts transmitting cycles and repeats the isochronous data stored in the LAB. Data is now transmitted (or discarded), at the same rate at which it is being received and therefore the IBUF latency is constant.

The station continues to repeat all incoming isochronous data in this way until the ring is stabilized, (i.e., some other station has entered the RESYNC state and will become master). After this initialization period, and the sustain flag is set, the IBUF is managed similarly to the way it is in master stations to compensate for ring latency changes. If the sustain flag is not set, the IBUF is treated as strict FIFO, and its latency remains constant. The initialization period applies only after transitions from basic mode to hybrid mode. In particular, it does not apply if the ring enters the monitor contention process because of the removal of a master station after the ring has become operational in hybrid mode.

Figure 6:
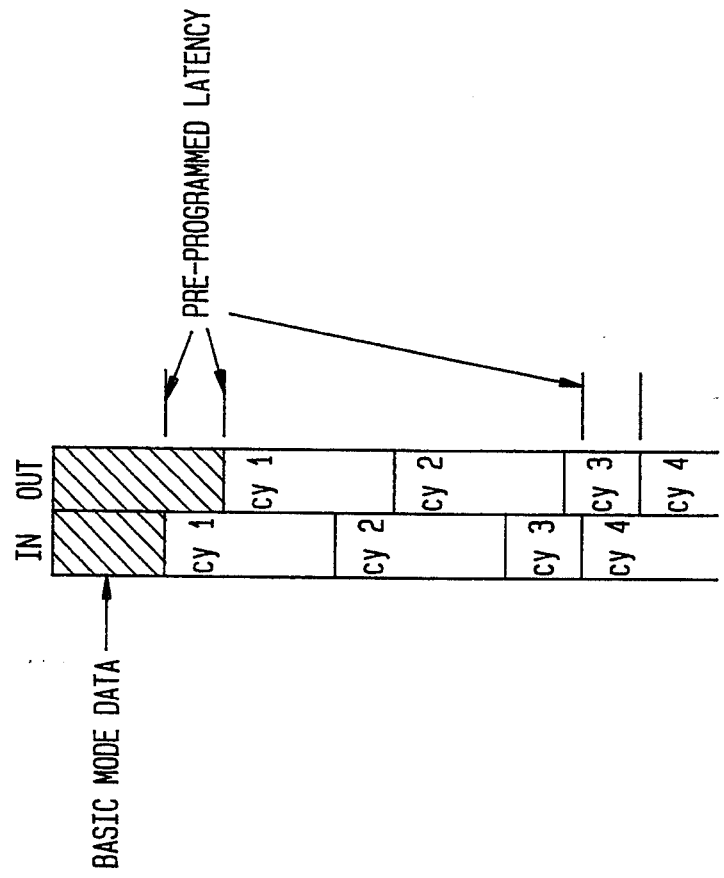

FIG. 6 illustrates the initialization process in a slave station. Note that IBUF latency is held constant, regardless of the pattern of incoming isochronous data, even if aborted or late cycles are received. The slave station exits the initialization period with the correct latency established. A slave station does not fill or generate cycles during initialization even if its Sustain flag is set.

Operation with LAB Engaged—Master or Slave Station

After a sustaining slave has completed its IBUF initialization period, or in a master station, the station will provide cycles on 125 μs boundaries. Since the timing of transmitted cycles is constant, the IBUF latency will change if the timing of incoming cycles changes. Small timing changes will be absorbed by the IBUF without any discontinuity in the ring's data. However, large timing changes due to sections of the ring being added or deleted will cause some data discontinuity, but resynchronization is not necessary if the slave latencies are correctly initialized and the timing changes are less than a cycle.

Figure 7:
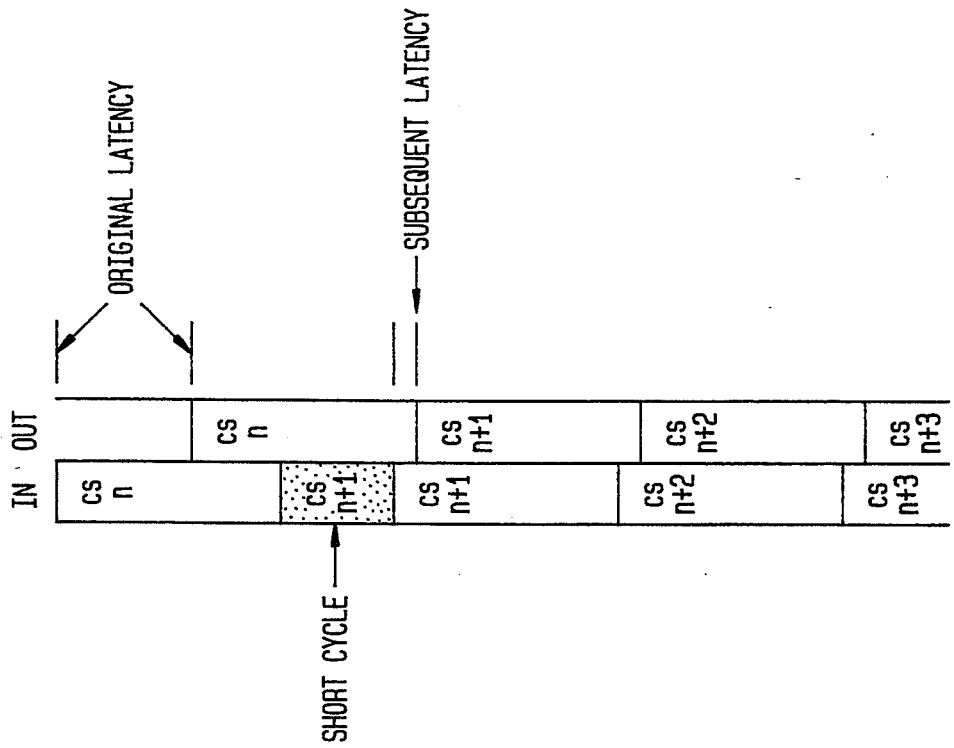
Figure 8:
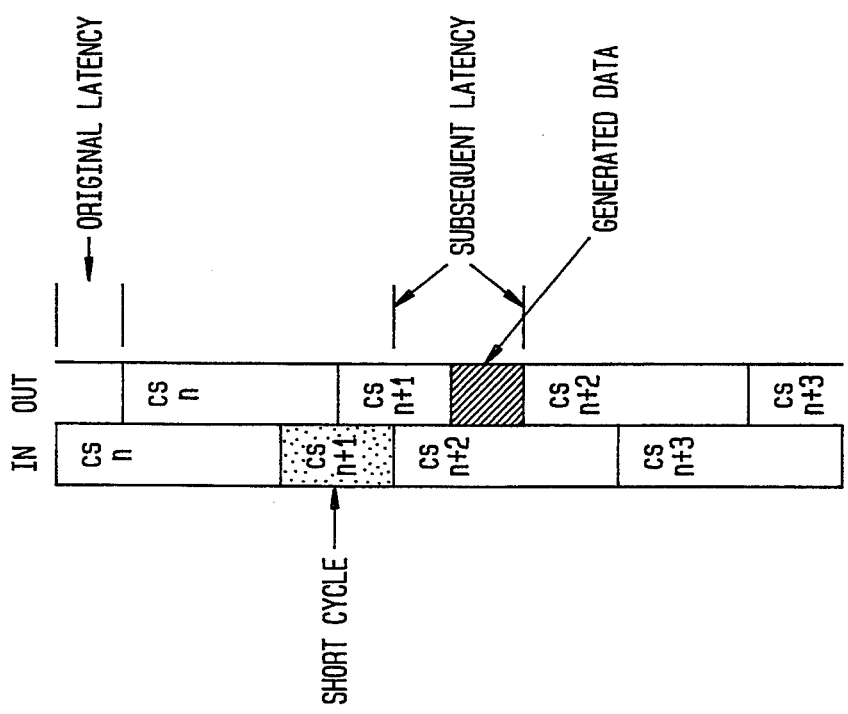

The symptoms of both ring additions and deletions can be the receipt of either early cycles or late cycles. What distinguishes the two are the cycle sequence numbers of the received cycles. If an early cycle header is received, the previous cycle will be short. FIGS. 7 and 8 show the receipt of a short cycle. In FIG. 7, this is due to the deletion of a ring section. In FIG. 8 the receipt of an early cycle is due to the addition of a ring section. In FIG. 7, the initial latency is small, the short cycle is filled out with idles, and the next cycle has increased latency. In FIG. 8, the initial latency is large, and the short cycle is not transmitted. Instead, the following incoming cycle is transmitted with reduced latency. (Note that the next cycle in has the same cycle sequence number as the short cycle.) In FIG. 8, there are two cycles with sequence number 'n+1' in the IBUF when 'cs n+1' is to be transmitted. In accordance with our invention, the decision as to which cycle to repeat is made with the help of cycle state status.

Figure 10:
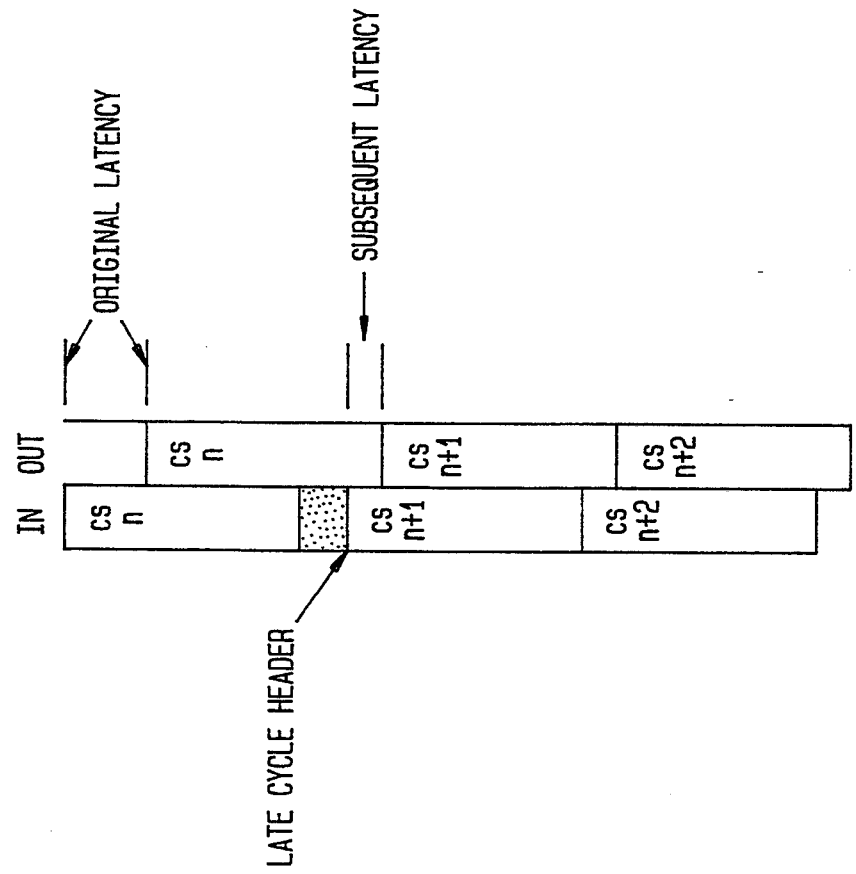
Figure 9:
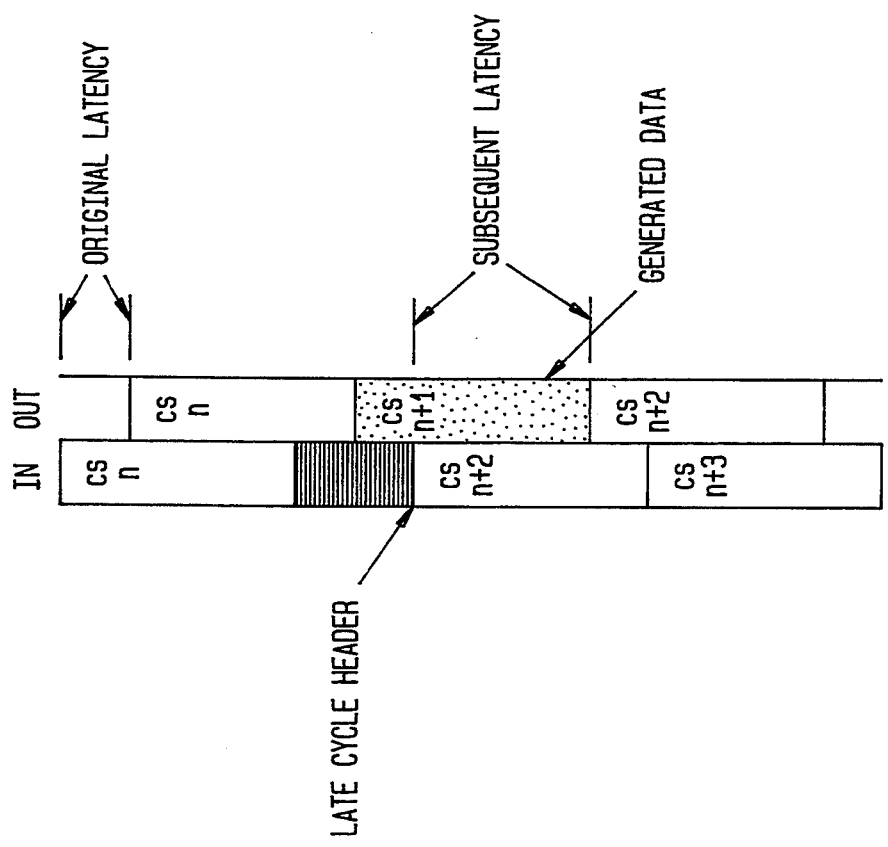

FIG. 9 shows the receipt of a late cycle because of a deletion of a ring section. In this case, no cycle is available when the missing cycle is to be repeated, so one is generated. When the next incoming cycle is received (note the out of order sequence number), it is repeated, but with a much larger latency. FIG. 10 shows the receipt of a late cycle because of the addition of a ring section. In this case, the IBUF just repeats the late cycle with reduced latency. The extra symbols received at the end of a cycle n are effectively deleted. In all cases illustrated by FIGS. 7-10, the total ring latency seen by stations downstream of the station is constant.

Monitor Contention and Transitions

The most complex IBUF initialization occurs during monitor contention. During monitor contention it is possible for a station that is capable of becoming a master to enter the standby state. For example, if the station receives an HRC_Start(Contend) command, the station moves from the basic state to the standby state immediately. If the station receives a cycle with a lower rank than its own while in the basic state, it will also move into the standby state. If a higher ranked station leaves the ring during monitor contention, the station could go to standby after being a slave for a number of cycles. Finally, a station can become a slave as a result of losing the monitor contention process, or move to the RESYNC state if it wins.

A station in the standby state cannot "know" whether it is ultimately going to be a slave or a master. For slaves, the latency is taken from a programmable register. For master stations, the latency must be determined by the ring. Our solution is an extension of the process of initializing a slave's IBUF. Thus, we assume that a station in the standby state always has its LAB engaged. All of the actions discussed below for IBUF initialization occur before the ring stabilizes, and only immediately after leaving the basic state. If a station enters the slave state, it establishes its pre-programmed latency (if any) before it begins transmitting cycles. It transmits idles while establishing latency. Once latency is established, the slave station repeats all received isochronous data, keeping the IBUF latency constant. A slave cannot alter its latency in response to the ring until after the initialization period.

If a station enters the standby state as a result of an HRC_START(contend) command, or because of the receipt of a cycle with a rank lower than its own while in the basic state, the station immediately begins transmitting cycles with its own rank, with minimal latency in the IBUF. Stations in standby will transmit complete cycles (unless they become slaves in the middle of transmitting a cycle). Since a station in standby state transmits cycles every 125 μ-seconds, the IBUF latency changes with the changing timing of the ring. Ring timing can change dramatically, since slave stations insert latency as they enter the hybrid mode, and other standby stations insert latency when they later become slaves. If a station emerges as a monitor contention winner, it moves to the RESYNC state with the latency in its IBUF compensating correctly for the total ring latency.

If one station backs off to another, thereby leaving the standby state to become a slave, it will abort the transmission of cycles with its own timing, and transmit idles until its IBUF has the preprogrammed latency relative to the winning cycle. It will then begin repeating the winning cycle, and follow the other IBUF slave initialization policies. Should a station enter the standby state while it is establishing its pre-programmed latency as a slave, it will first establish the latency while transmitting idles before its begins the transmission of cycles with its own rank. This avoids the potential of ring oscillations as a result of single bit errors in the cycle header. If a station goes to standby state as a result of an error, and then results to slave on the following cycle, its IBUF latency remains constant.

If a station leaves the standby state to go to the RESYNC state, it follows the threshold rules of RESYNC, and thus will enter the master state with the proper ring compensated latency. After the initialization period, slave stations implement their normal IBUF operations. All slave stations will leave the initialization period with their IBUF latencies equal to their pre-programmed values.

Figure 11:
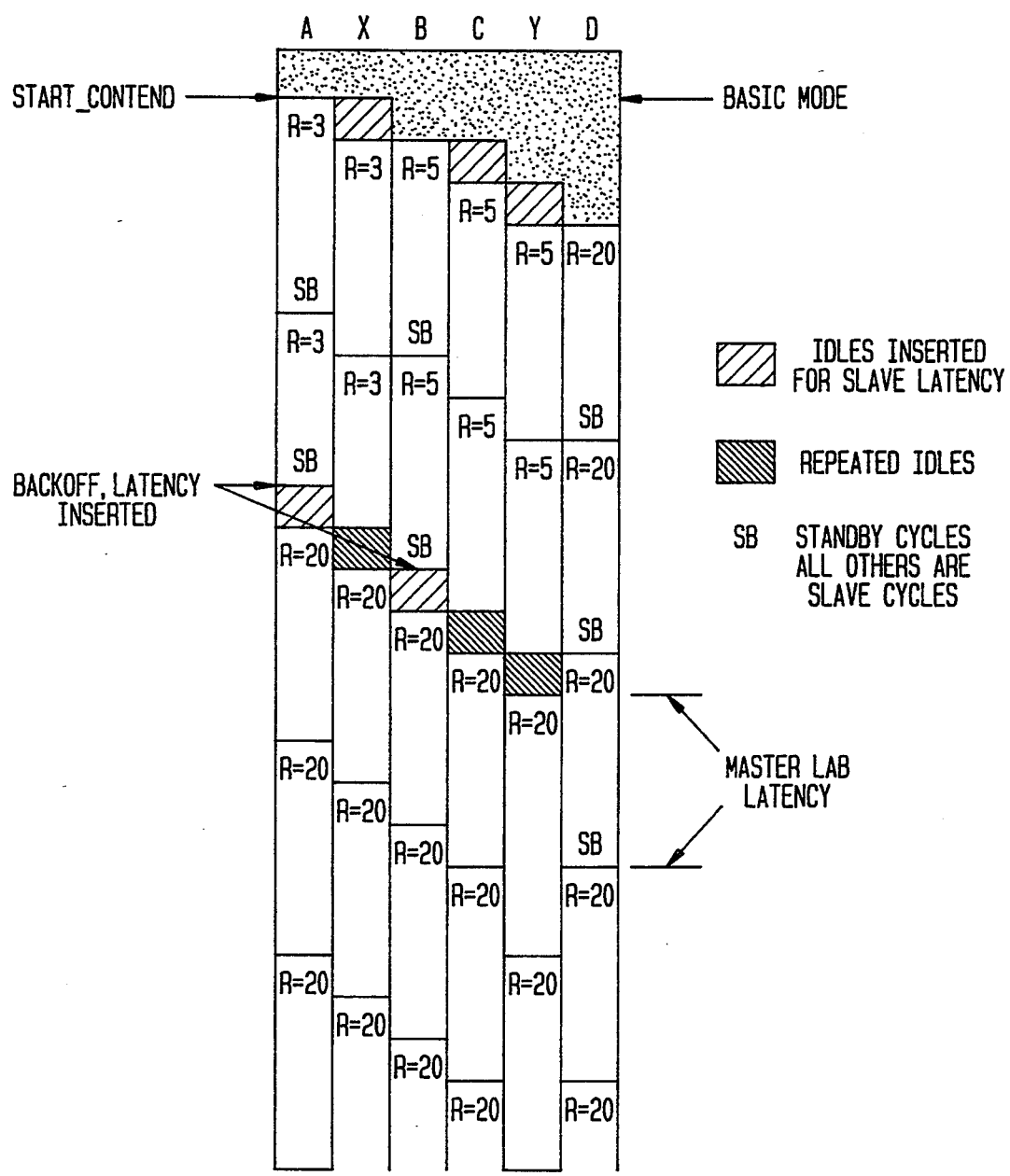

FIG. 11 illustrates the monitor contention process on a ring for the case where there are six stations, A, B, C, D, E and F, on the ring. Stations A, B, C, and D have ranks of 3, 5, 2 and 20, respectively. Stations X and Y are unranked or do not have their contend flags set, and thus are capable of only slave mode operation. Each column shows the output of each station - a station's input is the column to its left. A's input is D's output. A starts the process upon receipt of an HRC_START-(contend) command, and issues a standby cycle with its rank of 3. X receives the cycle and becomes a slave, repeating the cycle after establishing its LAB latency. B receives the cycles from X, and enters the standby state, immediately transmitting a cycle with its rank of 5. Stations C and Y become n slaves in the same manner as X, and eventually D receives a cycle with a rank of 5. D enters standby and transmits a cycle with its rank of 20. When A receives D's cycle, it backs off, becoming a slave, and repeats D's cycle after aborting its own outgoing cycle and transmitting idles to establish its slave mode latency. X is repeating A's output, so the cycle with rank of 20 is received at B with two stations' latency. B backs off to the cycle as A did before it. Since C and Y are repeating, D receives its own cycle back with 5 stations' delay. D's IBUF latency is correctly compensating for the ring latency when D receives its own cycle from the ring. Thus, D is ready to become a master. All the other stations correctly have their IBUF latencies set to the pre-programmed values as slaves.

The PBUF

Figure 12:
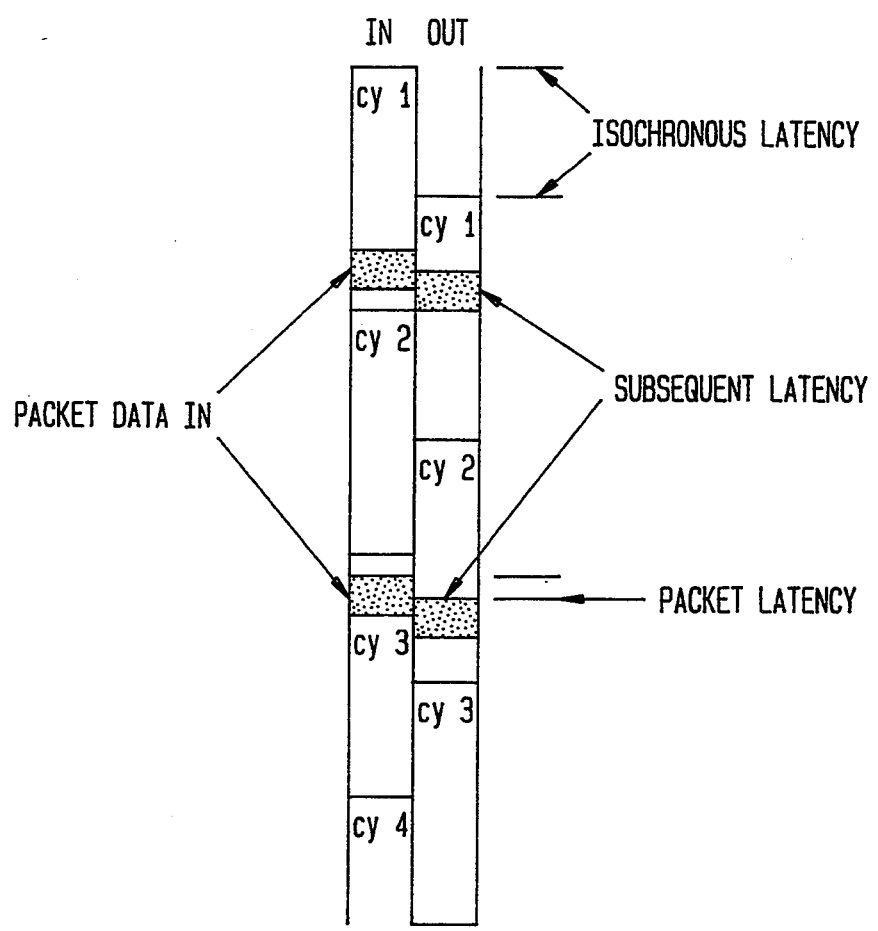

When the station's LAB is engaged, the PBUF stores packet symbols copied from received cycles. The goal of the management of packet data is to reduce latency as much as possible, independently of the latency of the isochronous data. FIG. 12 shows the relationship of packet data within the cycle structures of received and transmitted cycles. Since the packet latency is small, packet data received in cycle 3 is transmitted in outgoing cycle 2. It is possible for the packet latency of the ring to be a small fraction of a cycle while the isochronous latency is several cycles.

While the goal is to keep packet latency small, it is still possible for the depth of the PBUF to grow close to the latency of the IBUF. If a programming template change is required, it is issued by the master station when it is holding the token. After the master station has issued the new programming template, it releases the token to the ring. If the template change was from all packet wideband channels to all isochronous channels, the master station is in the position of accepting a number of packet symbol pairs equal to the total ring latency, while it can transmit packet data only in the dedicated packet group. Thus, the potential amount of packet buffer storage required in the master station is equal to the total ring latency.

To avoid the loss of valid packet data, the station implements several rules regarding the management of packet data and buffer. In slave stations, packet data received following a programming template change will not be transmitted before the new programming template is transmitted. Thus, the master station can safely discard all packet data following its issuance of a new programming template until the template returns to the master from the ring. This is so because all of the packet data in the ring between the master station and ahead of the new programming template is data logically following a token. These packet symbols can only be idles or frame fragments.

Note, that this rule implies that the packet buffer depth in slave stations can grow to equal the size of the IBUF latency following a programming template change. Since the latency grows in every slave that has its LAB engaged, programming template changes can temporarily cause the packet channel latency to become quite large. In order to reduce the packet latency, stations can safely discard all incoming packet data after they have received a token and placed it into their packet buffers. A station continues to discard incoming packet data until it has transmitted the token out of its buffer. At this point packet latency in a station is reduced to a minimum. If errors occur in a received programming template, the packet data in the received cycle must be discarded. A minimal amount of latency will be set up in the packet buffer before symbol pairs are retrieved for transmission. This ensures that the packet buffer does not underflow during the receipt of an incoming cycle header. The value of the latency in symbol pairs is obtained from a programmable register.

Cycle State Status

In the case of a master station, or a slave station with the LAB engaged (sustain flag set), it is possible to have multiple cycles in the LAB at one time. This can come about either because the latency is slightly greater than one cycle or because ring disruptions have cause cycle fragmentation to occur. In such cases it is important to maintain information specific to each cycle (e.g., cycle sequence number, start address and program template change) for use so long as this cycle resides in the LAB. Such information is stored in one of three cycle status registers (CSR): Last, which indicates the most recent cycle received; Next, which indicates the next most recent cycle received and Current, which indicates the current cycle being sourced from this station.

In the case of a Slave with the LAB engaged as cycles are repeated in the same order and with the same timing as they were received, the CSRs are begun and forwarded in step with the cycles. When a cycle arrives, information specific to it is put in Last. When a new cycle enters, Last is forwarded to Next. When a cycle is sourced, Last (or Next, depending in the local latency) will be forwarded to Current.

In the case of a Master or a Slave sustaining, when a new cycle is to be sourced based on the Cycle Request Clock, Last and Next contain the information required to determine which cycle to choose and where it is located. The appropriate one is then forwarded to Current.

Figure 13:
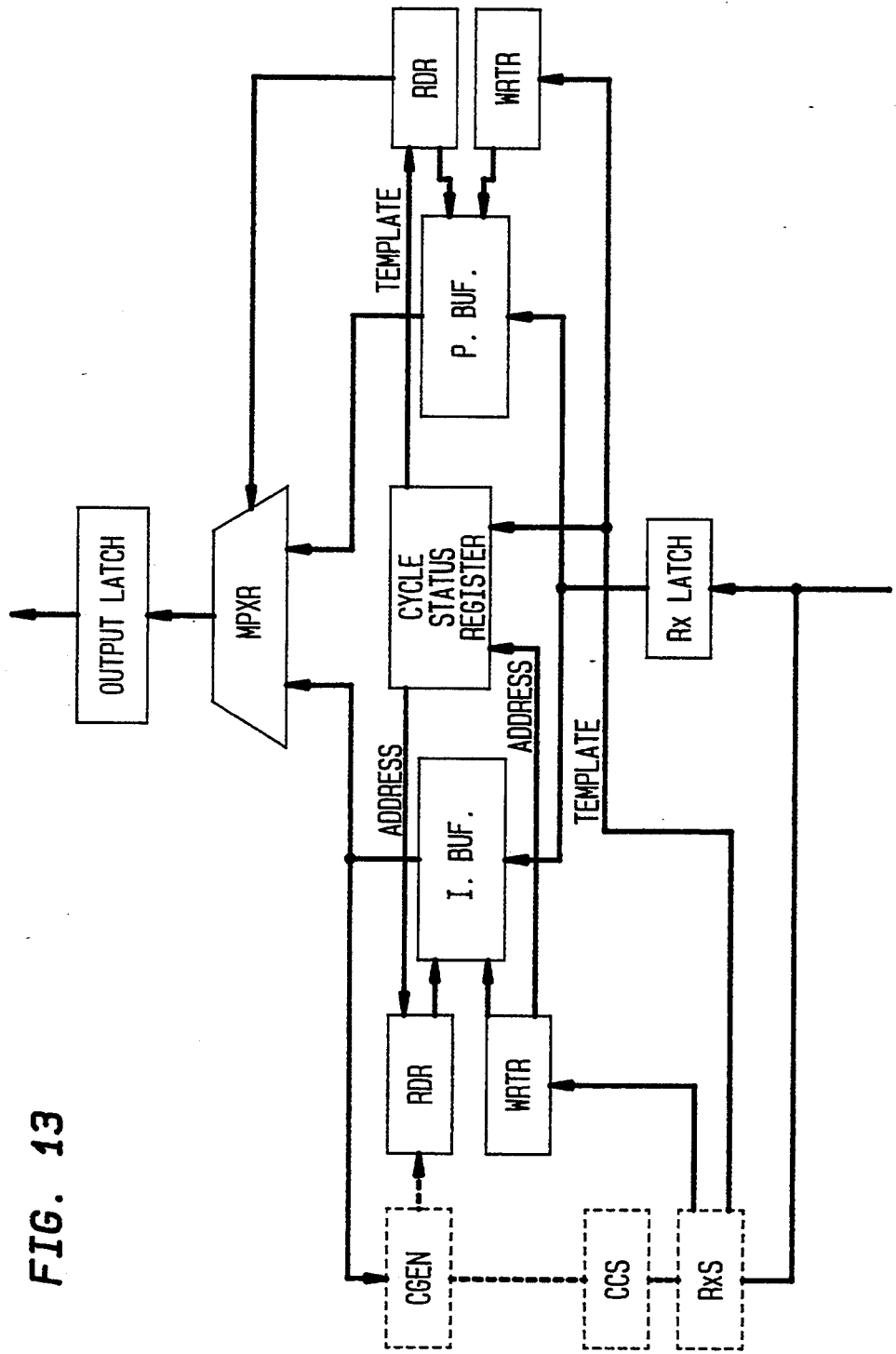
FIG. 13 shows the circuitry of our invention in which the LAB is divided into two registers, the IBUF and the PBUF, which are controlled to maintain compatible isochronous and packet data transmission on the ring.

The IBUF and PBUF Associated Circuitry—(FIG. 13)

In FIG. 13 the cycle generator CGEN, the cycle control state machine, CCS, and the receive state machine, RxS, perform functions as described in the above-mentioned "FDDI Hybrid Ring Control" publication. Briefly, however, the main function of the cycle generate state machine, CGEN, is to generate cycles to go out on the ring. When the CGEN is located in a master station, the timing for the beginning of each cycle is taken from a master 8 KHz clock, while for a slave station, the timing for the beginning of each cycle is taken from data arriving on the ring. In the case of a slave which has its latency adjustment buffer, LAB, engaged, the timing is taken from data exiting the LAB. The main function of the cycle control state machine in a master station is to control the state of the ring or, in a slave station, to monitor the state of the ring. The receive state machine, RxS recognizes cycles as they arrive and forwards information about each cycle to other circuitry of the station, where required.

The remaining circuitry of FIG. 13 performs the following functions. The Rx Latch is a holding register which latches data for an interval of time sufficient to allow the receive state machine RxS to perform its functions. The cycle status register, CS Reg., is a holding register to store information specific to each cycle that arrives. The information stored includes the starting address of each cycle as stored in the IBUF; the completion status of each cycle (null, aborted, pending or complete); and cycle programming template information. The IBUF is a 2K×10 dual port RAM which stores isochronous packet data as well as all other data received while in cycle mode. The output of the IBUF will be multiplexed with the PBUF data and cycle generate state machine information to form the outgoing cycle. The PBUF is a 2K×10 bit dual port RAM which stores only packet data that is part of each arriving cycle. The output of the PBUF will be multiplexed with the IBUF data and cycle generate state machine information to form the outgoing cycle. The IBUF WRTR is a state machine which receives control from the receive state machine, RxS, and which controls the writing of data into the IBUF and the storing of information about each cycle into the CS Reg. The IBUF RDR is a state machine that receives control from the cycle generate state machine and the CS Reg. and controls the reading of data from the IBUF. The PBUF WRTR is a state machine that controls the writing of data into the PBUF. It receives control from the receive state machine, RxS. The PBUF RDR is a state machine that controls the reading of data from the PBUF. It receives control from the cycle generate state machine and the CS Reg. The MPXR is a multiplexer that combines data and control symbols from the IBUF, PBUF and the cycle state generate machine to form the outgoing cycle to the ring. The output latch is a holding register to latch all processed internal data prior to sending it out onto the ring.

The foregoing is illustrative of the principles of our invention. Numerous modifications may be made by those skilled in the art without departing from the spirit and scope of our invention.

What is claimed is:

1. A hybrid network including a ring and at least one station on said ring having a hybrid multiplexer for receiving cycles containing packet and isochronous data from, and transmitting cycles containing packet and isochronous data to said ring, said hybrid multiplexer having a latency adjustment buffer (LAB) for providing a variable latency between the receipt of incoming isochronous data and the transmission of outgoing isochronous data comprising:

a packet buffer and an isochronous buffer;

means for entering arriving packet data into both said packet buffer and said isochronous buffer and for tracking the addresses in said isochronous buffer at which said packet data and said isochronous data are stored;

means for entering arriving isochronous data solely into said isochronous buffer;

means respective to each said buffer for reading data therefrom;

means for selectively controlling the address at which said isochronous data is read from said isochronous buffer to adjust the latency thereof; and means for incrementing the address in said isochronous buffer as packet data is read from said packet buffer.

2. A hybrid ring network according to claim 1 wherein said means for selectively controlling said isochronous buffer adjusts said variable latency when the potential isochronous latency is less than a minimum threshold to force an additional cycle's worth of delay and to shed latency when the potential latency becomes larger than a full cycle.

3. A hybrid ring network according to claim 1 wherein said packet and isochronous data includes symbol pairs and wherein a pre-programmed initial latency is established in said isochronous buffer in accordance with a predetermined number of said symbol pairs.

4. A hybrid ring network according to claim 3 wherein said initial latency is inserted in said isochronous buffer when the ring transitions from providing packet switching service to providing both isochronous and packet data services.

* * * * *